US00RE43631E

(19) United States
(12) Reissued Patent
Lonka

(10) Patent Number: US RE43,631 E
(45) Date of Reissued Patent: Sep. 4, 2012

(54) MOBILE COMMUNICATIONS DEVICE WITH A CAMERA

(75) Inventor: Pekka Lonka, Salo (FI)

(73) Assignee: Nokia Corporation, Espoo (FI)

(21) Appl. No.: 10/692,273

(22) Filed: Oct. 23, 2003

Related U.S. Patent Documents

Reissue of:
(64) Patent No.: 6,308,084
Issued: Oct. 23, 2001
Appl. No.: 09/325,025
Filed: Jun. 3, 1999

(30) Foreign Application Priority Data

Jun. 4, 1998 (FI) ..... 981274

(51) Int. Cl.
*H04M 1/00* (2006.01)

(52) U.S. Cl. ..... 455/556.1; 455/556.2; 455/575.4; 379/185; 348/376; 348/14.01; 348/552; 396/429

(58) Field of Classification Search ..... 455/556.1, 455/556.2, 575.4, 575.1; 348/376, 14.01, 348/552, 14.02, 220.1, 333.01, 240.99; 379/185, 379/433; 396/429
See application file for complete search history.

(56) References Cited

U.S. PATENT DOCUMENTS

| | | | | |
|---|---|---|---|---|
| 5,414,444 | A | 5/1995 | Britz | 345/156 |
| 5,491,507 | A * | 2/1996 | Umezawa et al. | 348/14.02 |
| 5,666,159 | A | 9/1997 | Parulski et al. | 348/211 |
| 5,907,615 | A * | 5/1999 | Kaschke | 379/433.12 |
| 6,073,034 | A * | 6/2000 | Jacobsen et al. | 455/566 |
| 6,137,525 | A * | 10/2000 | Lee et al. | 348/14.02 |
| 6,278,884 | B1 * | 8/2001 | Kim | 455/556.1 |
| 6,392,697 | B1 * | 5/2002 | Tanaka et al. | 348/220.1 |
| 6,943,839 | B1 * | 9/2005 | Matsumoto et al. | 348/333.01 |

FOREIGN PATENT DOCUMENTS

| | | |
|---|---|---|
| DE | 196 40 645 A1 | 9/1997 |
| DE | 297 22 657 U1 | 6/1998 |
| EP | 0 898 405 A2 | 2/1999 |
| WO | WO 93/12604 | 6/1993 |
| WO | WO 95/00374 | 1/1995 |
| WO | WO 96/38762 | 12/1996 |
| WO | WO 97/26744 | 7/1997 |

* cited by examiner

*Primary Examiner* — Danh Le
(74) *Attorney, Agent, or Firm* — Harrington & Smith

(57) ABSTRACT

The invention pertains to a mobile communications device with a camera, comprising a microphone (5), loudspeaker, display, keypad and camera. According to the invention the mobile communications device comprises at least two parts covering each other alternatively completely in the transport position of the camera or partly in the operational position of the camera so that when the parts (1, 2) cover each other in the transport position of the camera the lens (13) of the camera is protected, and in the operational position of the camera the lens (13) of the camera is exposed. Such a mobile communications device is easy to use and includes a protected lens (13) the protection of which is based on normal procedures carried out by the user of the mobile communications device when using the device.

20 Claims, 3 Drawing Sheets

MOBILE COMMUNICATIONS DEVICE WITH A CAMERA

Figure 1A:
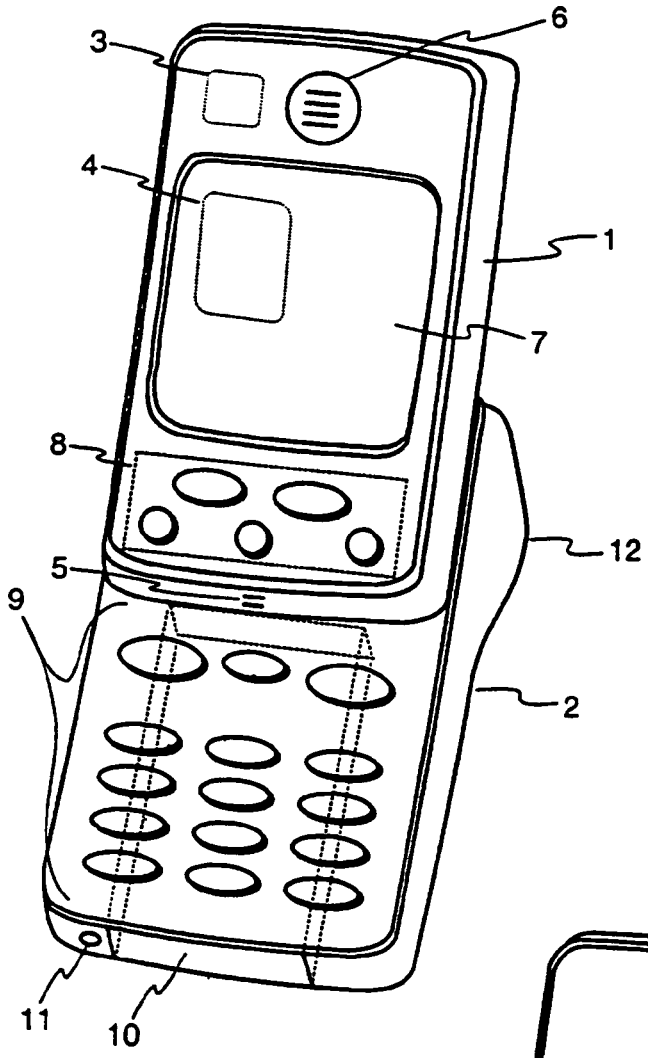

Matter enclosed in heavy brackets [ ] appears in the original patent but forms no part of this reissue specification; matter printed in italics indicates the additions made by reissue.

The invention relates to a mobile communications device with a camera, which can be used, in addition to normal mobile telephone and data communications, to take photographs.

From patent document WO 96/38762 it is known a camera integrated into a mobile communications device, wherein the lens of the camera is always exposed like in a normal camera or is brought out from beneath a keypad, being thus protected when the camera is not in use. The lens is released e.g. by moving or lifting the keypad and returned to its place at the same time as the keypad is returned to its place.

A problem with the known devices is that an unprotected lens of a camera integrated into a mobile communications device is susceptible to dirt and scratches or a protected lens is difficult to bring out and return to the storage position.

From the patent document U.S. Pat. No. 5,666,159 it is known an electronic camera system wherein digital photographs taken with the system are wirelessly transmitted to many kinds of remote apparatus.

An object of the invention is to provide an ergonomic mobile communications device with a camera with which photographing is easy and wherein the lens of the camera is protected in such a manner that no special measures are required apart from the normal use of the mobile communications device to bring out the lens.

The objects are achieved using a construction not unlike the sliding cover in modern mobile communications devices, but at the same time dividing the mobile communications device into two roughly equal parts which are slid as far apart as possible before use. Function keys advantageously include at least three and not more than ten keys. Typical function keys include call start and end keys, arrow keys or corresponding browsing keys and memory management keys. Function keys may also include a known multifunction key.

The invention pertains to a mobile communications device with a camera, said device comprising a microphone, loudspeaker, display, keypad proper and a camera, and the mobile communications device comprises at least two parts covering each other alternatively completely in the transport position of the camera or partly in the operational position of the camera so that when the parts cover each other in the transport position of the camera the lens of the camera is protected, and in the operational position of the camera the lens of the camera is exposed. According to the invention an image can be projected through the lens of the camera and the display serves as a viewfinder for the camera by displaying the through the lens projected image to the user of the device and the lens of the camera is placed in the device essentially on a different side than the display.

In accordance with the invention, when the mobile communications device is opened so as to be employed in its proper use, the lens of the camera is brought out from between the parts of the device where it has been well protected from environmental effects such as dust and scratching objects. When in operational state, the mobile communications device can be used for taking photographs preferably by pressing one function key. The display of the mobile communications device serves as a viewfinder when aiming the camera and when the shutter is released, where-after the image is stored in memory and the picture in the viewfinder is fixed on the display. The mobile communications device is also designed so as to have a shape easy to grip so that when holding the mobile communications device in hand, one would not touch the lens of the camera. Preferred embodiments of the invention are presented in the dependent claims.

Figure 2A:
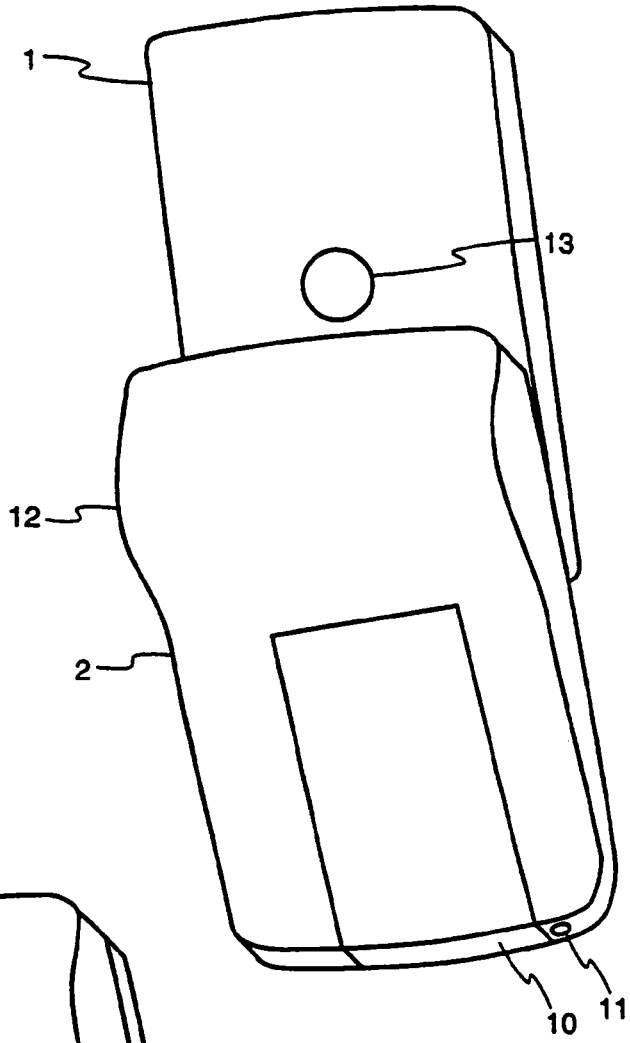
Figure 2B:
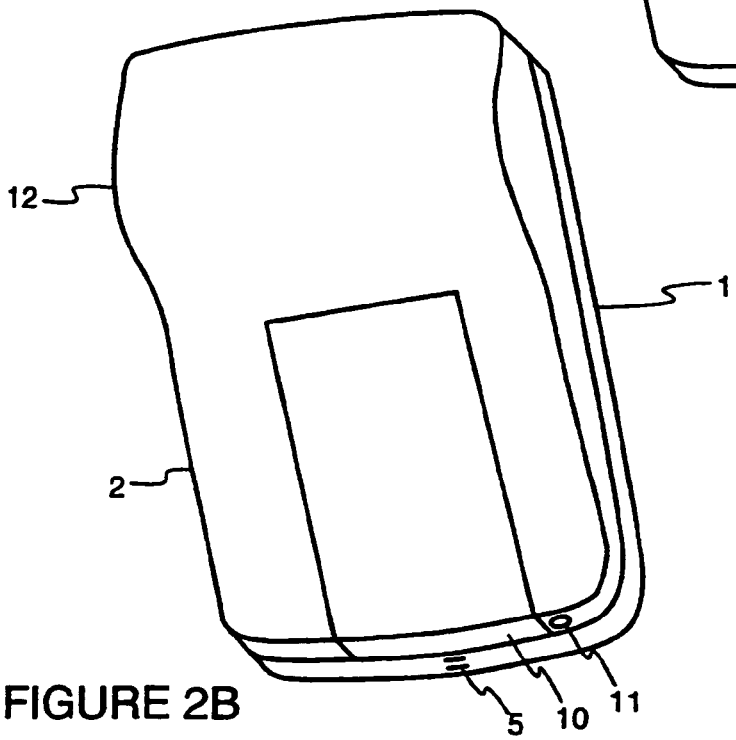
Figure 3:
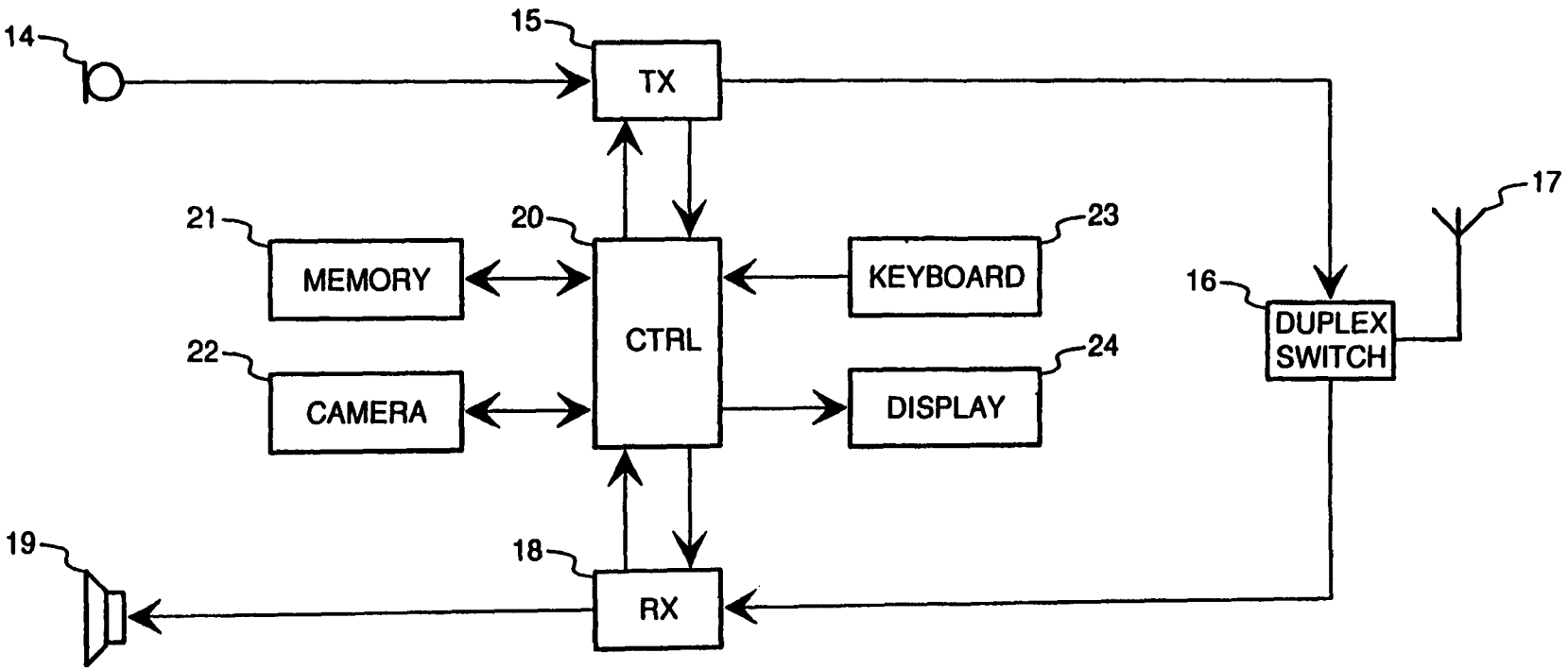

The invention will now be described in more detail with reference to the accompanying drawing wherein FIG. 1 shows a frontal view of a mobile communications device, FIG. 2 shows a rear view of a mobile communications device according to the invention, and FIG. 3 shows a block diagram of a mobile communications device according to the invention.

Figure 1B:
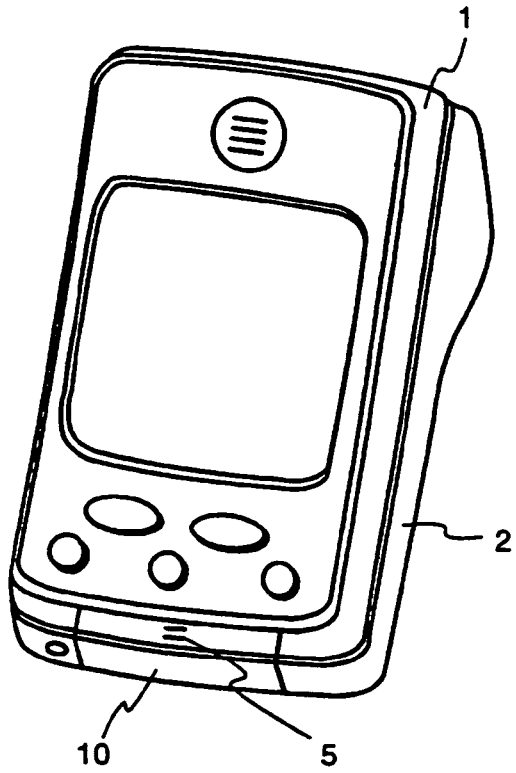

FIG. 1 show a frontal view of a mobile communications device which according to the invention has a camera lens depicted in FIG. 2 in the rear. The mobile communications device comprises two parts, a radio part 1 and a hand part 2 including the keypad proper. In FIG. 1A the mobile communications device is open in its operational position wherein the hand part 2 has been slid out from beneath the radio part 1. In FIG. 1B the mobile communications device is closed but can be used e.g. for calls by means of the function keys. The mobile communications device further comprises an internal antenna 3, radio part 4, microphone 5, loudspeaker 6, display 7, function keys 8, battery 10 and charge interface 11, which can be used also when the mobile communications device is closed in the transport position. In the operational position, also the keypad 9 proper can be used. Furthermore, the hand part 2 of the mobile communications device has a shape 12 that is easy to grip. FIG. 1A shows in dashed lines both the outlines of the parts 3, 4, 10 inside the phone and the function keypad 8.

FIG. 2 show a rear view of a mobile communications device according to the invention. In FIG. 2A the mobile communications device is open in its operational position wherein the lens 13 of the camera according to the invention is exposed and ready to be used for taking photographs. In that state, the radio part 1 and hand part 2 have been slid as far apart as possible. A function key 8 is preferably utilized as a shutter release for the camera. In FIG. 2B the mobile communications device is closed in its storage position and cannot be used for taking photographs, but can be used for telephone calls by means of the function keys 8.

The location of the camera lens 13 on that side of the mobile communications device which is opposite to the display 7 makes it possible for the user to view the object of the photograph simultaneously both naturally past the mobile communications device and on the display 7. This construction is also advantageous to manufacture as the rear side of the mobile communications device can be manufactured using a single mould and the camera unit can be easily installed on top of a parallel printed circuit board unit in the radio part 1 of the mobile communications device. The lens 13 of the camera is well protected in the location described.

The battery 10 of the mobile communications device is located in that part of the mobile communications device which includes the keypad 9 proper in order to place the center of gravity as low as possible to make photographing easier in vertical position.

FIG. 3 shows a block diagram of the essential parts of a mobile communications device according to the invention. Speech voiced into a microphone 4 is taken by means of a transmitter 15 to a duplex switch 16 and further to an antenna 17. Speech received by the antenna 17 is taken by means of a receiver 18 to a loudspeaker 19 to be heard. All functions are controlled by a controller 20 connected to a keyboard 23 for providing input. Such input includes e.g. the release of the shutter of the camera 22. Photographs taken with the camera 22 are stored in memory 21 and shown on the display 24.

As an example, let us consider the use of the mobile communications device in photography. When the mobile communications device is in transport position, as depicted in FIGS. 1B and 2B, the user takes hold of the radio part 1 and hand part 2 and pulls the parts as far apart as possible so that the mobile communications device preferably is activated for dialing or photographing. Alternatively, the mobile communications device is activated for photography using a menu control. When photography is activated, the user sees the image of the viewfinder of the camera on the display 7 of the radio part 1 and can aim the camera. The picture is taken by pressing a key 8, 9 on the mobile communications device so that said key in this mode functions as a shutter release button. The function of the key serving as a shutter release preferably depends on the mode of the mobile communications device and said key is located such that it is easily pressed e.g. with a thumb in order to take the picture. Such a key preferably belongs to the function keys 8 in the mobile communications device described here, but in a device with different proportions it may also be located elsewhere, such as in the keypad 9 proper, where, however, it is easy to use considering the size of the device. The function of the key may be different in call and photo modes but it may also vary within those modes. A key that functions permanently as a shutter release is also possible, but it cannot be used during normal mobile communications.

As the shutter is released the image in the viewfinder is fixed on the display 7, showing the picture that was taken and stored preferably in the device's own memory, but in principle it is possible to use alternatively or in addition separate additional memory in order to increase the number of pictures that can be stored.

Pressing the shutter release button causes the camera to shake slightly, and to reduce blurredness caused by the shake the device waits for a user-selectable period of time after the shutter release button has been pressed before storing the image in memory. Said delay can be menu-selected preferably between 0 to 1 seconds at 200 ms steps.

Having pressed the shutter release button and when the image is fixed on the display the photographer can check whether the picture is good, as regards e.g. the composition and lighting, and then either save the picture or take a new one. The picture is stored in the memory of the mobile communications device preferably in compressed format to save memory space; one such compression algorithm is the JPEG (Joint Photographers Experts Group) algorithm. A stored image can be further transmitted e.g. to a personal computer (PC) using an infrared or wire link, to an electronic mail system or to another mobile communications device via air interface or to a fax machine, for example.

Stored images can be used in the mobile communications device e.g. in a telephone directory with pictures.

The implementati n is not described in greater detail here as a person skilled in the art can realize the arrangement according to the invention on the basis of what has been disclosed above.

The invention is not limited to the embodiments described above, but many modifications are possible within the scope of the inventional idea defined by the claims set forth below.

What is claimed is:

1. A mobile communications device with a camera, comprising a microphone [(5)], a loudspeaker [(6)], a display [(7)], keypad [(9)] proper, and a camera, and the mobile communications device comprises at least two parts [(1, 2)] covering each other [alternatively] completely in the transport position of the camera or partly in the operational position of the camera so that when the parts [(1, 2)] cover each other in the transport position of the camera the lens [(13)] of the camera is protected, and in the operational position of the camera the lens [(13)] of the camera is exposed, [characterized in that] *wherein* an image can be projected through the lens [(13)] of the camera and the display [(7) serves] *comprises* as a viewfinder for the camera by displaying the through the lens projected image to the user of the device and the lens [(13)] of the camera is placed in the device essentially on [a different] *an opposite* side than the display [(7)].

2. The mobile communications device of claim 1, [characterized in that] *wherein* the device also comprises function keys [(8)] and the device can be used for telephone calls by means of the microphone [(5)], the loudspeaker [(6)], the display [(7)] and the function keys [(8)] even when the lens [(13)] of the camera is covered.

3. The mobile communications device of claim 1, [characterized in that] *wherein* the parts [(1, 2)] covering each other partly or completely move by sliding with respect to each other.

4. The mobile communications device of claim 1, [characterized in that] *wherein* the part [(2)] including the keypad [(9)] proper of the mobile communications device has [in it] a shaped grip [(12)] to make [it] easier [to hold] *holding* the mobile communications device in hand when used for taking photographs.

5. The mobile communications device of claim 1, [characterized in that] *wherein* a photograph is taken by pressing a button the function of which varies in accordance with the operating mode of the mobile communications device.

6. The mobile communications device of claim 1, [characterized in that] *wherein* the battery [(10)] of the mobile communications device is located in that part of the mobile communications device which includes the keypad [(9)] proper in order to place the center of gravity as low as possible to make photographing easier in *a* vertical position.

7. The mobile communications device of claim 1, [characterized in that] *wherein* pictures are being stored in [the] a memory [(21)] of the mobile communications device and the pictures are used in the mobile communications device in a telephone directory.

*8. A mobile communication device with a camera, said device comprising:*

*a first part comprising a first face of the first part and a second face of the first part, said faces being on opposite sides of said first part,*

*a second part comprising a first face of the second part and a second face of the second part, said faces being on opposite sides of said second part,*

*a display located on said first face of the first part,*

*a protectable camera lens for a camera, located on said second face of the first part, and*

*a plurality of keys in a keypad located on said first face of the second part,*

*wherein said first and second parts are connected to each other.*

*9. A mobile communications device according to claim 8, wherein said first and said second parts are arranged slidably connected to each other.*

*10. A mobile communications device according to claim 8, wherein the second face of the first part and the first face of the said second part are adjacent to each other.*

*11. A mobile communication device according to claim 8, wherein said first part has essentially a geometric shape of a rectangular prism.*

*12. A mobile communications device according to claim 8, wherein said second part has essentially a geometric shape of a rectangular prism.*

*13. A mobile communications device according to claim 8 having a transport position and an operational position.*

*14. A mobile communications device according to claim 13, wherein:*

*in the transport position, the second face of the said first part covers said keypad and the first face of the second part covers said camera lens, and*

*in the operational position, said camera lens and said keypad are exposed.*

*15. A mobile communications device according to claim 8, wherein said display is arranged to serve as a viewfinder for the camera for displaying to a user of said communications device an image projected through the camera lens.*

*16. A mobile communications device with a camera, said device comprising:*

*a first part comprising a first face and a second face, said faces being on opposite sides of said first part,*

*a second part comprising a first face and a second face, said faces being on opposite sides of said second part,*

*a display located on said first face of said first part,*

*a camera lens located on said second face of said first part, and*

*a plurality of keys located on said first face of said second part,*

*wherein said first and second parts are slidably coupled to each other with said second face of said first part and said first face of said second part adjacent to each other.*

*17. A mobile communications device according to claim 16, wherein said first part and said second part essentially have the geometric shape of a rectangular prism.*

*18. A mobile communications device according to claim 16, wherein:*

*said second face of said first part covers said keypad and said first face of said second part covers said camera in a transport position, and*

*said camera and said keys are exposed in an operational position.*

*19. A mobile communication device according to claim 16, wherein an image can be projected through said camera lens and said display serves as a viewfinder for the camera by displaying a through the lens projected image to a user of the device.*

*20. A mobile communications device according to claim 16, wherein the camera lens is protectable by the second part.*

* * * * *